Aug. 10, 1965     C. L. SCHRADER     3,199,314
TORQUE CONTROL DEVICE
Filed April 8, 1963     3 Sheets-Sheet 1
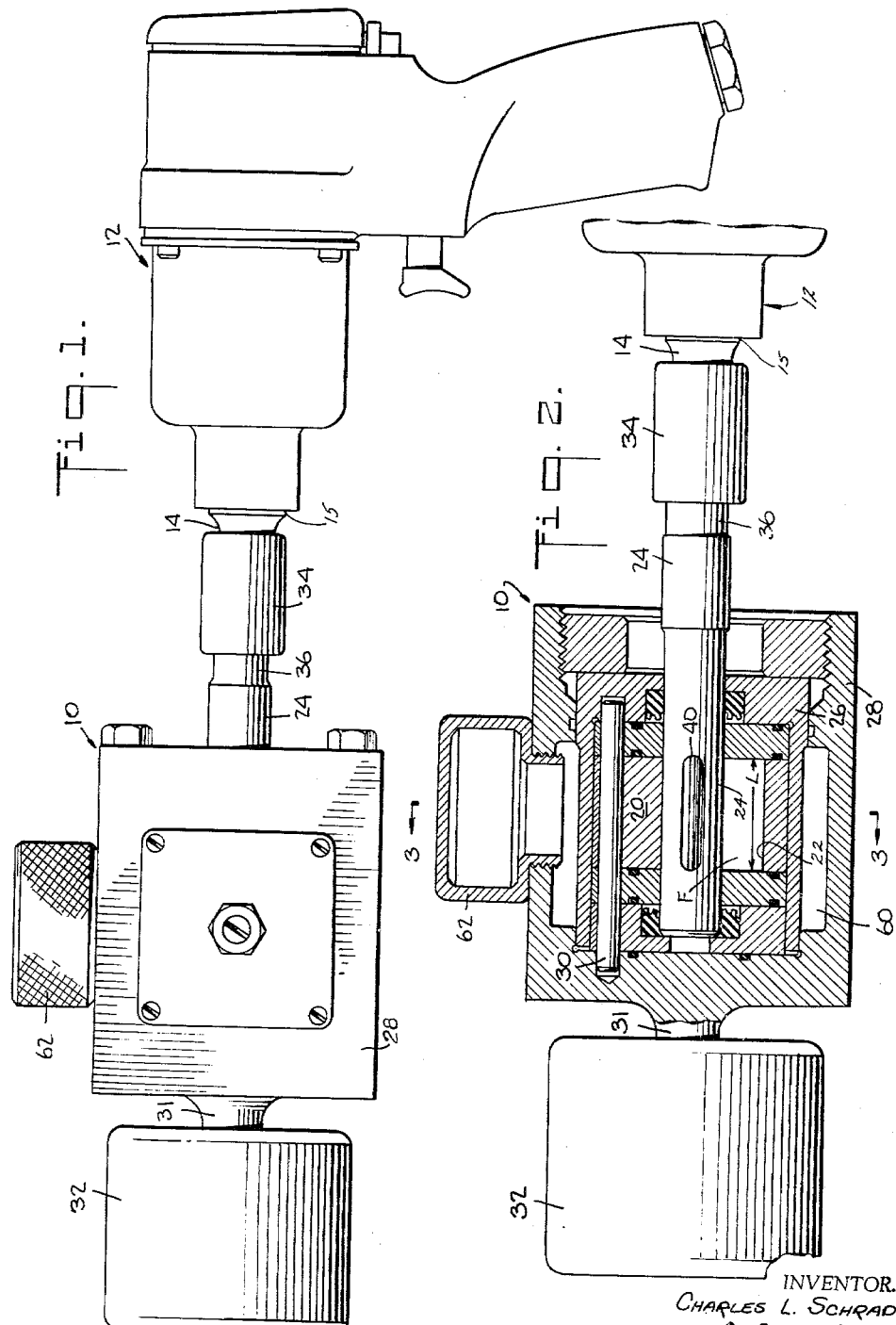
INVENTOR.
CHARLES L. SCHRADER
BY
ATTORNEY

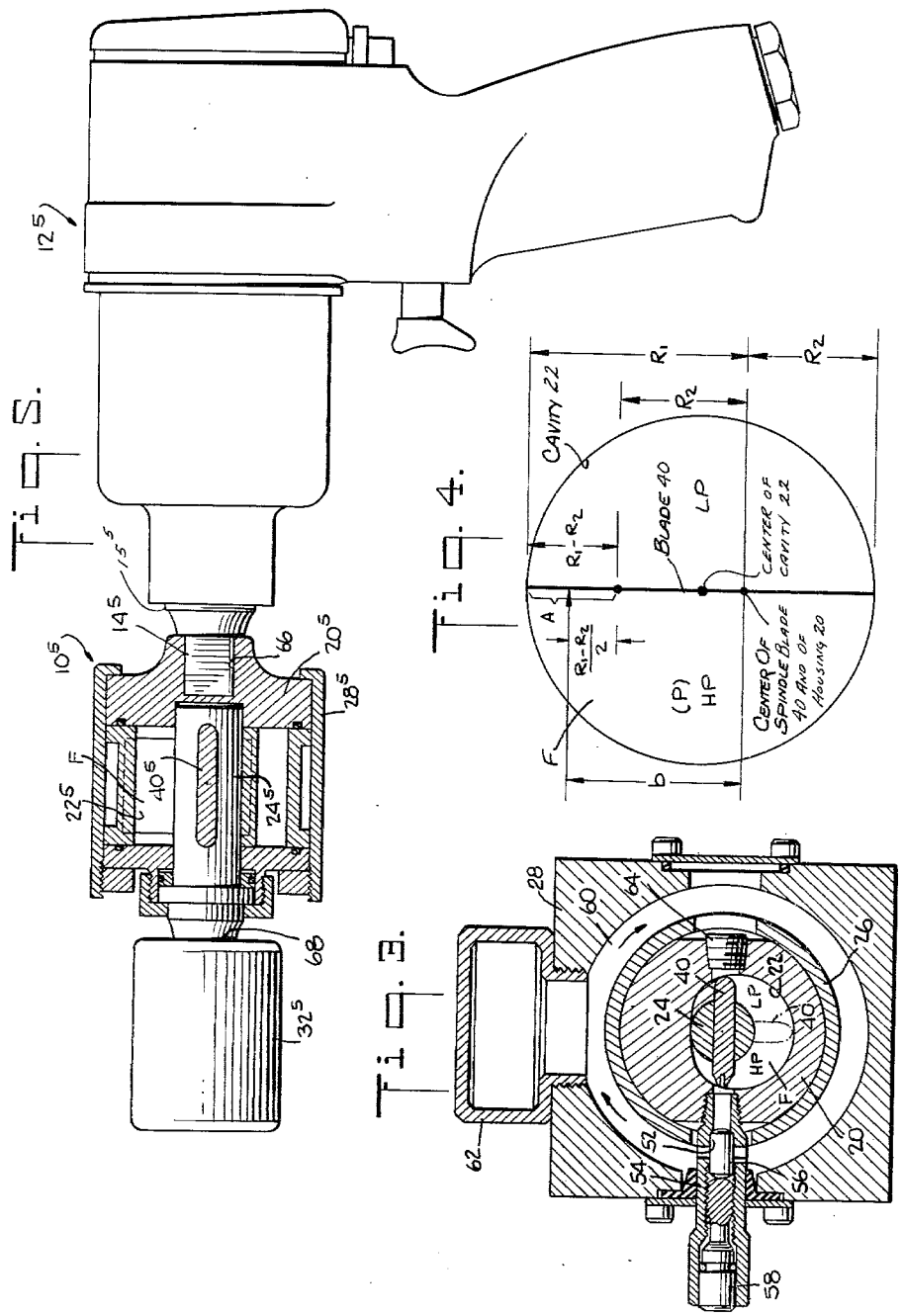

Aug. 10, 1965
C. L. SCHRADER
3,199,314
TORQUE CONTROL DEVICE
Filed April 8, 1963
3 Sheets-Sheet 3
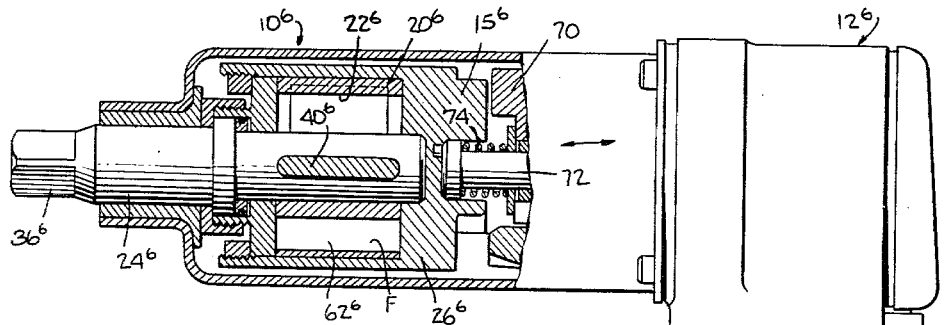
Fig.6.
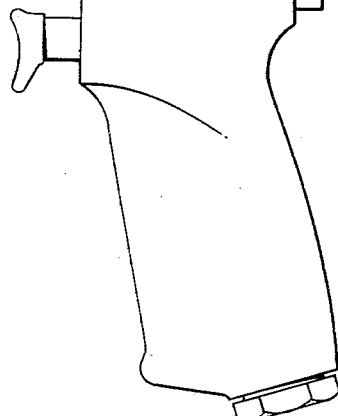
Fig.7.
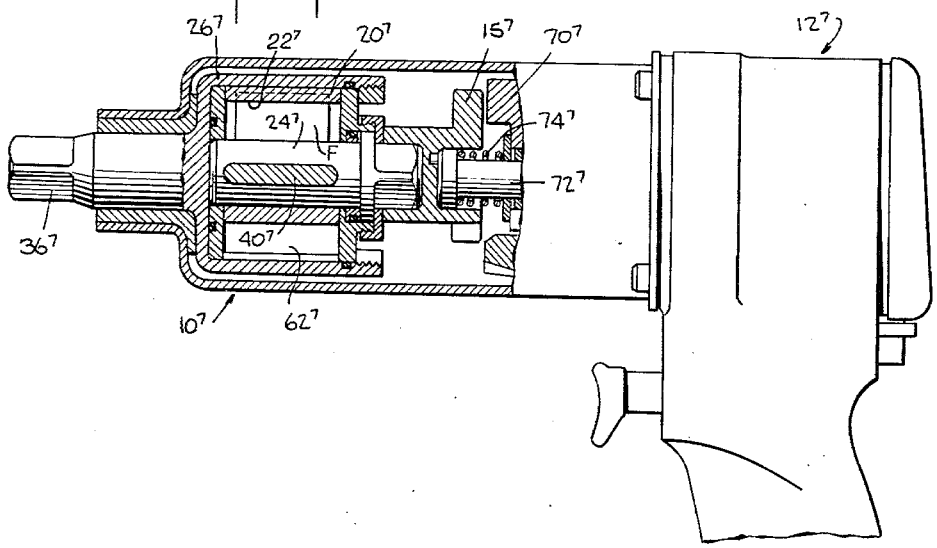
INVENTOR.
CHARLES L. SCHRADER
BY 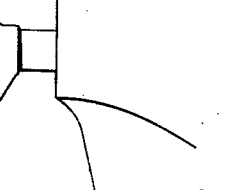
ATTORNEY

United States Patent Office 3,199,314
Patented Aug. 10, 1965

3,199,314
TORQUE CONTROL DEVICE
Charles L. Schrader, Sayre, Pa., assignor to Ingersoll-Rand Company, New York, N.Y., a corporation of New Jersey
Filed Apr. 8, 1963, Ser. No. 271,218
9 Claims. (Cl. 64—26)

This invention relates to power tools and more particularly to an improved torque control device for such power tools.

Heretofore, power tools, such as pneumatic and electric tools of the impact type (such as disclosed in U.S. Patent No. 2,718,803 issued September 27, 1955 to F. A. Jimerson) have been provided with torque control devices in which a direct drive for the impact tool is not possible. In addition, conventional torque control devices do not provide accurate torque control, are difficult to adjust to the final desired torque, and do not have a long tool part life. A direct drive means that the motor of the power tool is directly coupled to the hammer mechanism and every time a blow is struck all rotating parts stall or stop.

It is the general object of the present invention to avoid and overcome the foregoing and other difficulties of and objections to prior art practices by the provision of an improved torque control device for a power tool, which torque control device provides a direct drive for the power tool, provides more accurate torque control than conventional torque control devices, is easy to adjust to the final desired torque, has a longer tool part life due to fluid cushioning, and provides torque control for a directly driven tool.

The aforesaid objects of the present invention, and other objects which will become apparent as the description proceeds, are achieved by providing in combination a power tool having a driven member and an impulse tool provided with a cavity adapted to contain a fluid and having spindle means in the cavity and in the fluid. Coupling means are employed for connecting the driven member with one end of one of the housing means and the spindle means. A socket for engaging a fastener is carried on the other of the housing means and the spindle means. Pressure control means are associated with the cavity for controlling the fluid pressure in the cavity and hence the torque produced by the power tool.

Alternatively the power tool has its driving member engageable with a driven member carried by one of the housing means and spindle means with the driving socket on the other of the housing means and spindle means.

For a better understanding of the present invention reference should be had to the accompanying drawings, wherein like numerals of reference indicate similar parts throughout the several views and wherein:

FIGURE 1 is a side elevational view of a power tool provided with the improved torque control device of the present invention, the torque control device having its spindle connected to the power tool and its inner housing to the driving socket;

FIGURE 2 is a vertical sectional view of the improved torque control device and a fragmentary portion of the power tool;

FIGURE 3 is a vertical sectional view taken along the line 3—3 of FIGURE 2 in the direction of the arrows;

FIGURE 4 is a diagrammatic view of the cavity and spindle blade showing the calculation of final desired torque;

FIGURE 5 is a view similar to FIGURE 2 showing the inner housing of the torque control device connected to the power tool and the inner housing provided with a driving socket;

FIGURE 6 is a view similar to FIGURES 2 and 5 of a further alternative embodiment wherein the driven member of the power tool is carried by the inner housing of the torque control device and the spindle carries the driven socket; and FIGURE 7 is a view similar to FIGURES 2, 5 and 6 of yet another alternative embodiment wherein the driven member of the power tool is carried by the spindle of the torque control device and the inner housing carries the driven socket.

Although the principles of the present invention are broadly applicable to torque control devices for power tools, the present invention is particularly adapted for use in conjunction with a power tool of the impact type and hence it has been so illustrated and will be so described.

With specific reference to the form of the present invention illustrated in the drawings, and referring particularly to FIGURES 1 and 2, a torque control device is indicated generally by the reference numeral 10.

This torque control device 10 is used for controlling the torque of a power tool, such as an impact wrench 12 (FIGS. 1 and 2), having an output end or square drive 14 on its driven member or anvil (FIGS. 1 and 2). Torque control device 10 is of the general type disclosed in U.S. Patent No. 3,116,617, granted January 7, 1964 to D. K. Skoog; U.S. patent application, Serial No. 115,714, filed June 8, 1961 and now abandoned; and U.S. patent application, Serial No. 244,151 filed December 12, 1962 by D. K. Skoog et al. and assigned to the same assignee as the present application.

*Torque control device*

As shown in FIGURES 2 and 3 the torque control device 10 has a housing means, such as inner housing 20 (FIGS. 2 and 3), provided with a cavity 22 adapted to contain a fluid, such as oil F, and spindle means, such as the spindle 24 having a spindle blade 40 extending therethrough and slidably supported thereby, (FIGS 1, 2 and 3) disposed in such cavity 22 and in such oil F. The inner housing 20, inner casing 26 and outer casing 28 are pinned together by a pin 30 (FIG. 2) and the outer casing 28 (FIGS. 1–3), in turn is connected by a square drive 31 (FIGS. 1 and 2) to a driving socket 32 (FIGS. 1 and 2).

*Coupling means*

Coupling means, such as a connecting socket 34 (FIGS. 1 and 2), connects the square drive 14 of the impact wrench 12 to one end of one of the housing means and spindle means, in this case the square drive 36 on the spindle 24.

*Operation of torque control device*

As the square drive 14 of the impact wrench 12 drives the spindle 24 in clockwise direction (FIG. 3) and the spindle blade 40 (FIGS. 2–4) moves from the solid line position (FIG. 3) through the dotted line position, the spindle 24 and its blade 40 operatively cooperate with the wall of cavity 22 to provide means for momentarily sealing off of the high pressure portion HP and the low pressure portion LP of cavity 22. Thus, momentarily, the fluid pressure in the high pressure portion HP of cavity 22 increases creating an impulse to drive housing 20 or provide a torque output. When the pressure increase tends to rise excessively, torque or pressure control means is provided to permit oil F to leak through restrictive orifice 52 (FIG. 3) defined by valve housing 54 and movable valve cylinder 56. The size of restrictive orifice 52 is determined by the position of adjustment screw 58. Oil F exits from the high pressure portion HP of the cavity 22 through restrictive orifice 52, oil chamber 60 (FIGS. 2 and 3) (supplied by expansion chamber 62) in the direction of the arrows (FIG. 3) and is sucked into oil inlet 64 (FIG. 3) extending into the low pressure portion LP of the cavity 22.

*Pressure control means*

It will be understood from the above description that the pressure control means (which controls the fluid pressure in the high pressure portion HP of cavity 22 and hence the final desired torque accurately) comprises valve cylinder 56, restrictive orifice 52, valve housing 54 and adjustment screw 58.

In FIGURE 4 if:

$F$ = Force in pounds on spindle blade 40 due to hydraulic pressure in cavity 22,
$L$ = Length of cavity 22 in inches (FIG. 2),
$P$ = Hydraulic pressure within cavity 22 in p.s.i.,
$A$ = Effective area of spindle blade 40 which produces torque,
$T$ = Torque in inch pounds,
$b$ = Distance in inches from center of rotation at which force F acts, Then $$A = (R_1 - R_2)L \text{ and } b = R_2 + \frac{(R_1 - R_2)}{2} = \frac{R_1 + R_2}{2}$$

But since $F = PA$ and $T = Fb$ then $$T = PAb = P(R_1 - R_2)L\frac{(R_1 - R_2)}{2}$$

$$T = \frac{PL}{2}(R_1^2 - R_2^2)$$

*Alternative embodiments*

It will be understood by those skilled in the art that alternatively as shown in FIGURE 5 that the square drive 14⁵ of the impact tool 12⁵ can be directly inserted into a socket 66 of the inner housing 20⁵, thus eliminating the coupling means (i.e. connecting socket 34) shown in FIGURES 1–3. Further a square drive 68 on the spindle 24⁵ is inserted into the driving socket 32⁵. A pin (not shown) similar to pin 30 (FIG. 2) is used to integrate inner housing 20⁵ and outer casing 28⁵.

Referring now to FIGURE 6 the driven member, the anvil 15⁶, of the power tool 12⁶ is carried by the inner casing 26⁶ and is engageable with a driving member, such as the hammer 70, by conventional reciprocating means. This reciprocating means comprises the cam driven shaft 72, a cam (not shown) the shaft 72 and a roller (not shown) on the hammer 70, and reciprocates the rotating hammer 70 in the axial direction shown by the arrows in FIGURE 6. A hammer return spring 74 returns the hammer 70 to its retracted or starting position. The square drive 36⁶ is carried by the spindle 24⁶. The inner housing 20⁶ and inner casing 26⁶ are integral.

In FIGURE 7 the driven member, the anvil 15⁷, is carried by the spindle 24⁷ while the integral inner housing 20⁷ and inner casing 26⁷ carry the square drive 36⁷ on which a socket (not shown) can be affixed.

It will be recognized by those skilled in the art that the objects of the present invention have been achieved by providing an improved torque control device for a power tool, which torque control device provides a direct drive for the power tool, provides more accurate torque control than conventional torque control devices, is easy to adjust to final desired torque, has longer tool part life due to fluid cushioning and provides torque control for a directly driven tool.

While in accordance with the patent statutes a preferred and alternative embodiment of the present invention has been illustrated and described in detail, it is to be particularly understood that the invention is not limited thereto or thereby.

I claim:
1. The combination comprising:
 (1) An impact device having an output member rotatably driven by impacting; and
 (2) an impulse device connected to the impact device and driven thereby for providing torque to an object, comprising:
  (a) housing means having a cavity containing fluid therein;
  (b) spindle means in said housing means and the fluid;
  (c) one of said means being provided with coupling means to said output member for rotation thereby, and the other of said means having means for engaging the object and applying torque thereto; and
  (d) said housing and spindle means being operatively associated with each other to act on the fluid when said one of said means is rotated by said output member for creating impulses to rotatably drive said other of said means.
2. The combination in accordance with claim 1, and said impulse device further comprising:
 (1) means operatively associated with the cavity to control the pressure of the fluid created by the action thereon by said housing and spindle means for controlling output torque to the object by controlling impulses which rotatably drive said other of said means.
3. The combination comprising:
 (1) an impact device having an output member rotatably driven by impacting, and
 (2) an impulse device connected to the impact device and driven thereby for providing torque to an object, comprising:
  (a) housing means having a cavity containing fluid therein;
  (b) spindle means in said housing means and the fluid;
  (c) one of said means being provided with coupling means to said output member for rotation thereby relative to the other of said means being rotatable by impulses and having means for engaging the object and providing torque thereto;
  (d) and means being operable during a relatively small portion of each revolution of said one of said means relative to said other of said means to dynamically seal off a portion of the fluid; and
  (e) said housing and spindle means being operatively associated with each other and said seal means to act on the sealed off portion of the fluid for creating impulses to rotatably drive said other of said means.
4. The combination in accordance with claim 3, and said impulse device further comprising:
 (1) means operatively associated with the cavity to control the pressure of the fluid created by the action thereon by said housing and spindle means for controlling output torque to the object by controlling impulses which rotatably drive said other of said means.
5. The combination comprising:
 (1) an impact device having an output member rotatably driven by impacting, and
 (2) an impulse device connected to the impact device and driven thereby for providing torque to an object, comprising:
  (a) housing means having a cavity containing fluid therein;
  (b) spindle means in said housing means and the fluid;
  (c) one of said means being provided with coupling means to said output member for rotation thereby relative to the other of said means being rotatable by impulses and having means for engaging the object and providing torque thereto; and (d) said housing and spindle means having seal means operable during a relatively small portion of each revolution of said one of said members to dynamically seal off a portion of the fluid, and being operatively associated with each other to act on the sealed off portion of the fluid for creating impulses to rotatably drive the other of said means.

6. The combination in accordance with claim 5, and said impulse device further comprising:

(i) means operatively associated with the cavity to control the pressure of the fluid created by the action thereon by said housing and spindle means for controlling output torque to the object by controlling impulses which rotatably drive said other of said means.

7. The combination in accordance with claim 5, wherein said sealing means includes:

(a) a portion of each of said housing means and spindle means disposed in sealing relation to each other during said small portion of each revolution of said one of said means relative to said other of said means.

8. The combination in accordance with claim 5, wherein said sealing means comprises:

(a) said spindle means being disposed in and cooperating with said housing means to form a seal on one side of said cavity; and (b) said housing and spindle means each having a portion disposed in sealing relation to each other during said small portion of each revolution of said one of said means relative to said other of said means to dynamically seal off with said seal formed by said spindle and housing means a portion of the fluid.

9. The combination in accordance with claim 8, and said impulse device further comprising:

(i) means operatively associated with the cavity to control the pressure of the fluid created by the action thereon by said housing and spindle means for controlling output torque to the object by controlling impulses which rotatably drive said other of said means.

References Cited by the Examiner

UNITED STATES PATENTS

| | | | |
|---|---|---|---|
| 2,108,270 | 2/38 | Rogers | 192—58 |
| 2,564,212 | 8/51 | Ramsey | 192—58 |
| 2,825,436 | 3/58 | Amtsberg | 192—30.5 |
| 2,881,884 | 4/59 | Amtsberg | 192—30.5 |
| 2,986,024 | 5/61 | Power | 64—28 |
| 3,116,617 | 1/64 | Skoog | 64—26 |

BROUGHTON G. DURHAM, *Primary Examiner.*

ROBERT C. RIORDON, *Examiner.*